PARTY LINE IDENTIFICATION CIRCUIT

Filed Sept. 16, 1957 2 Sheets-Sheet 1

INVENTOR
R. E. POWERS
BY Donald M Duft
ATTORNEY

Oct. 17, 1961 R. E. POWERS 3,005,052

PARTY LINE IDENTIFICATION CIRCUIT

Filed Sept. 16, 1957 2 Sheets-Sheet 2

INVENTOR
R. E. POWERS
BY Donald M. Duft
ATTORNEY 3,005,052
Patented Oct. 17, 1961

3,005,052

PARTY LINE IDENTIFICATION CIRCUIT

Robert E. Powers, North Andover, Mass., assignor to Bell Telephone Laboratories, Incorporated, New York, N.Y., a corporation of New York Filed Sept. 16, 1957, Ser. No. 684,048
5 Claims. (Cl. 179—17)

Figure 1:
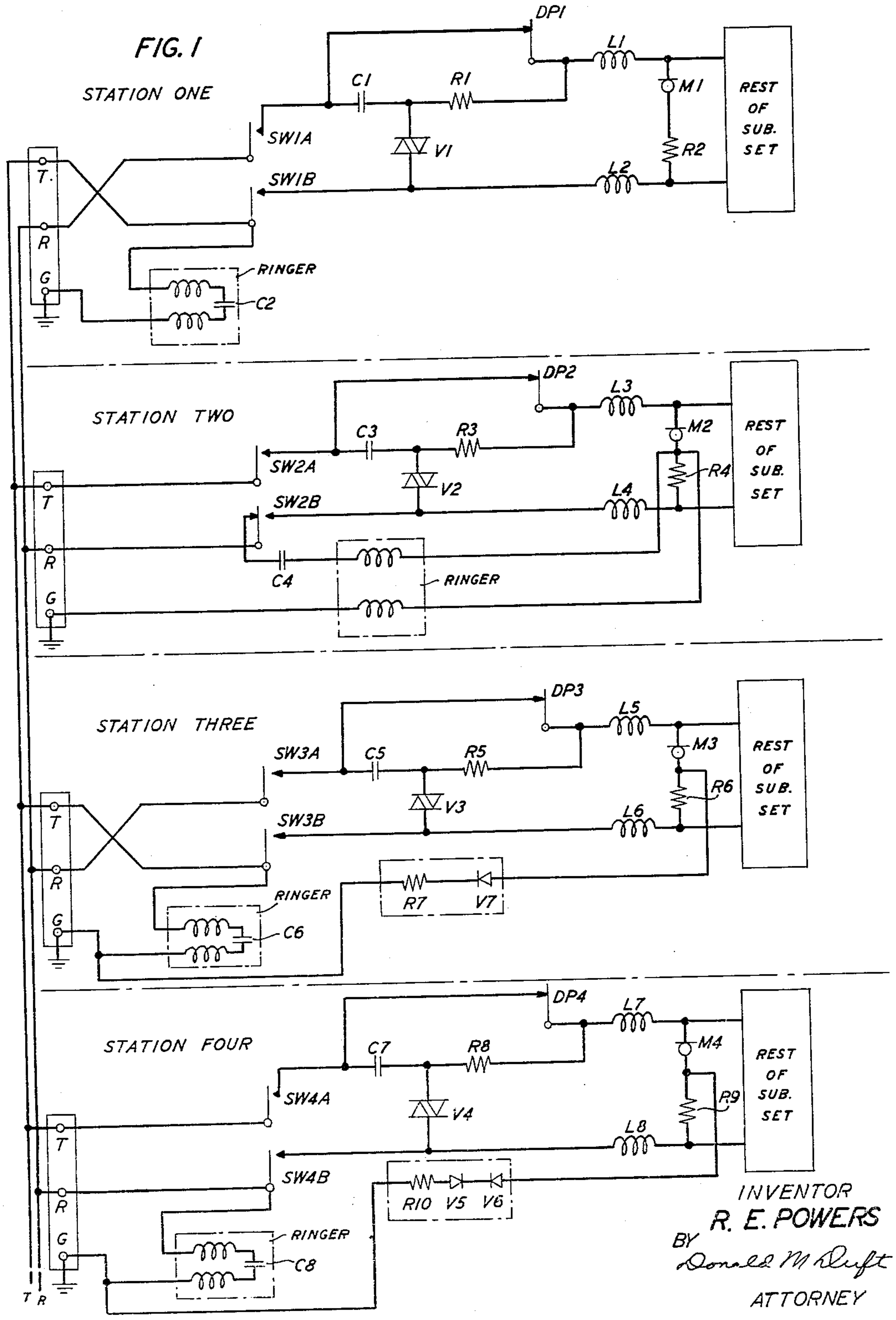

This invention relates in general to identification circuits and more particularly, to multiparty identification circuits which manifest the identity of the calling subscriber on a multiparty line.

Early in the development of the telephony art it became generally recognized that private line service was not economically feasible in every instance and that certain subscribers, such as those in sparsely populated areas of the country and those having a relatively low calling rate, could be served more economically by party lines. However, the introduction of party line service presented a concomitant problem, i.e., a simple method of identifying the calling subscriber on such lines. It is well known that the first method used to identify party line subscribers was for the central office operator to ask the calling subscriber his number and then operate a register or perform some other manual act to insure that the proper party was charged for the call. It was soon recognized that this method of party identification was not ideal and left much to be desired.

Since these early times, the problem has attracted the attention of many inventors, as can be observed by a perusal of that portion of the telephony art pertaining to this subject-matter. Included in this art are a vast number of patents disclosing many different circuits for identifying calling party-line subscribers. This developmental effort has, to date, produced commercially suitable circuits for automatically identifying subscribers on two-party lines. However, this effort has not yet produced a commercially acceptable identification circuit for four-party lines, as may be observed from the fact that even at the present stage of the telephony art, many telephone companies are still searching for an economical and accurate means for performing this function.

The development of customer-dialed toll switching systems, wherein a subscriber in one section of the country can dial a subscriber in another section of the country without the services of an operator, intensifies the need for a suitable circuit which will identify the calling subscriber on lines serving three or four parties. Until such a circuit is found, subscribers served by lines of this type cannot be fully integrated into the present-day nationwide dialing system. At the present time, when a subscriber served by one of these lines dials a subscriber in another part of the country, the call is momentarily interrupted by an intercept operator who orally ascertains the identity of the calling subscriber and keys this information into the switching system. It is, therefore, quite apparent that the development of a suitable identification circuit for party-line subscribers represents one of the more urgent problems in the present-day telephony art.

Accordingly, the object of this invention is to facilitate the identification of the calling party on multiparty lines.

More specifically, an object of this invention is to facilitate the identification of the calling subscriber on lines serving two, three, or four subscribers.

A further object of the invention is to facilitate the identification of the calling party when the line associated with said party serves from one to four subscribers.

A further object of this invention is to facilitate the identification of a calling party whether said party is individually served by a single line or by a line also serving from one to three additional subscribers.

It is a further object of the invention to provide a four-party identification circuit which will be compatible with one of the more popular presently used two-party identification circuits and which will thereby identify the calling party on a single party line, a two-party line, three-party line, or a four-party line.

The present invention provides a means whereby the calling party on a line serving from one to four parties can be quickly, economically, and accurately identified. The present invention has the advantage that it requires a minimum of modification at both the central office and at the individual subsets in order to adopt it for use with most present-day switching systems.

In accordance with the present invention, the subsets on a party line are modified so that each contains a direct-current impedance path to ground that is unique from those of the other subsets. The calling party is identified upon the initiation of a call by applying a first test potential to the line and then, depending upon the circuit operations resulting from the application of the first test potential, applying as a second test potential, one of a plurality of available test potentials. The identity of the calling party is manifested by a logic circuit which is controlled by the circuit operations resulting from the application of the two test potentials.

In accordance with the present invention, the subset of the first party on a four-party line contains no direct-current path to ground. This also may be called a path of extremely high impedance, if desired. The subset of the second party contains a low impedance direct-current path to ground through the ringer. The subset of the third party on the line contains a low impedance direct-current path to ground for positive potentials only. The subset of the fourth party contains a low impedance direct-current path to ground for relatively high negative potentials only. The central office is equipped with a circuit which at the proper time, depending upon the specific type of switching system with which the invention is used, presents a series of test potentials to the line and, by means of the circuit actions ensuing from the application of these test potentials, ascertains the identity of the calling line.

More specifically, a central office equipped to utilize the present invention is equipped with a test circuit containing a source of relatively high negative potential, a source of relatively low negative potential, and a source of relatively low positive potential. Advantageously, these potentials may comprise negative 130 volts, negative 48 volts, and positive 48 volts, respectively. Although the test circuit contains three available test potentials, only two are applied to the line during any single call.

The process of ascertaining the identity of the calling party begins with the application of the negative 130 volt potential to the tip and ring of the line which are simplexed at this time. The response of the central office identification circuit to the application of the 130 volt negative potential to the line determines whether the next test potential applied will be negative 48 volts or positive 48 volts. Specifically, if the first or third party on the line is initiating the call, the negative 130 volt potential will fail to find a suitably low impedance path to ground in the calling subset and the identification equipment in the central office will cause the positive 48 volt potential to be applied as the second test potential. If the first party on the line is initiating the call, the 48 volt positive direct-current test potential finds no low impedance path to ground because, as has already been mentioned, the subset of the first party contains a direct-current path to ground of infinitely high impedance. If the third party is now initiating a call, the positive test potential finds a low impedance path to ground through a diode in the third party's subset.

On the other hand, if the second or fourth party on the line is initiating the call, the negative 130 volt first test potential will find an impedance path to ground through the calling subset and will cause the negative 48 volts to be applied to the line as a second test instead of the positive 48 volt potential. If the second party is initiating the call the negative 48 volt test potential now applied finds a sufficiently low direct-current impedance path to ground in the calling subset to operate a relay in the central office. On the other hand, if the fourth party is initiating the call, the direct-current impedance path to ground in this subset is such that the resulting current flowing upon the application of the negative 48 volt test potential is not sufficient to operate the responsive relay in the test circuit. The identity of the calling party is manifested by a logic circuit in accordance with the circuit operations ensuing from the application of the two test potentials to the line.

It may be seen that although three test potentials are required at the central office, the identification of a calling party requires the use of only two test potentials per call, since the particular potential applied during the second test depends upon the response of the identification equipment to the first test potential. This feature constitutes one of the chief advantages of the present invention since it greatly shortens the duration of time required over that which would be necessary if the full series of three test potentials were applied on each and every call.

A feature of the invention relates to a circuit which sequentially and selectively applies a series of test potentials to a multiparty line in order to determine the identity of a calling subscriber thereon.

A further feature of the invention relates to a multiparty line whose various subsets are arranged to have impedances which vary in magnitude and/or polarity with respect to ground whereby the calling subscriber may be identified upon the initiation of a call by the selective application of a series of test potentials to said line. In accordance with the terminology used herein two impedances are said to vary in polarity when one or both comprises a nonlinear current device which makes the preferred direction of current flow through one impedance different from that of the other impedance which may have an opposite preferred direction of current flow or which may have no preferred direction of current flow.

A further feature of the invention relates to a central office party identification circuit which, in order to ascertain the identity of a calling party upon the initiation of a call, applies two out of three available test potentials to the calling line and determines the identity of the calling party from the magnitude and/or polarity with respect to ground of the impedance encountered in the calling subset.

Figure 2:
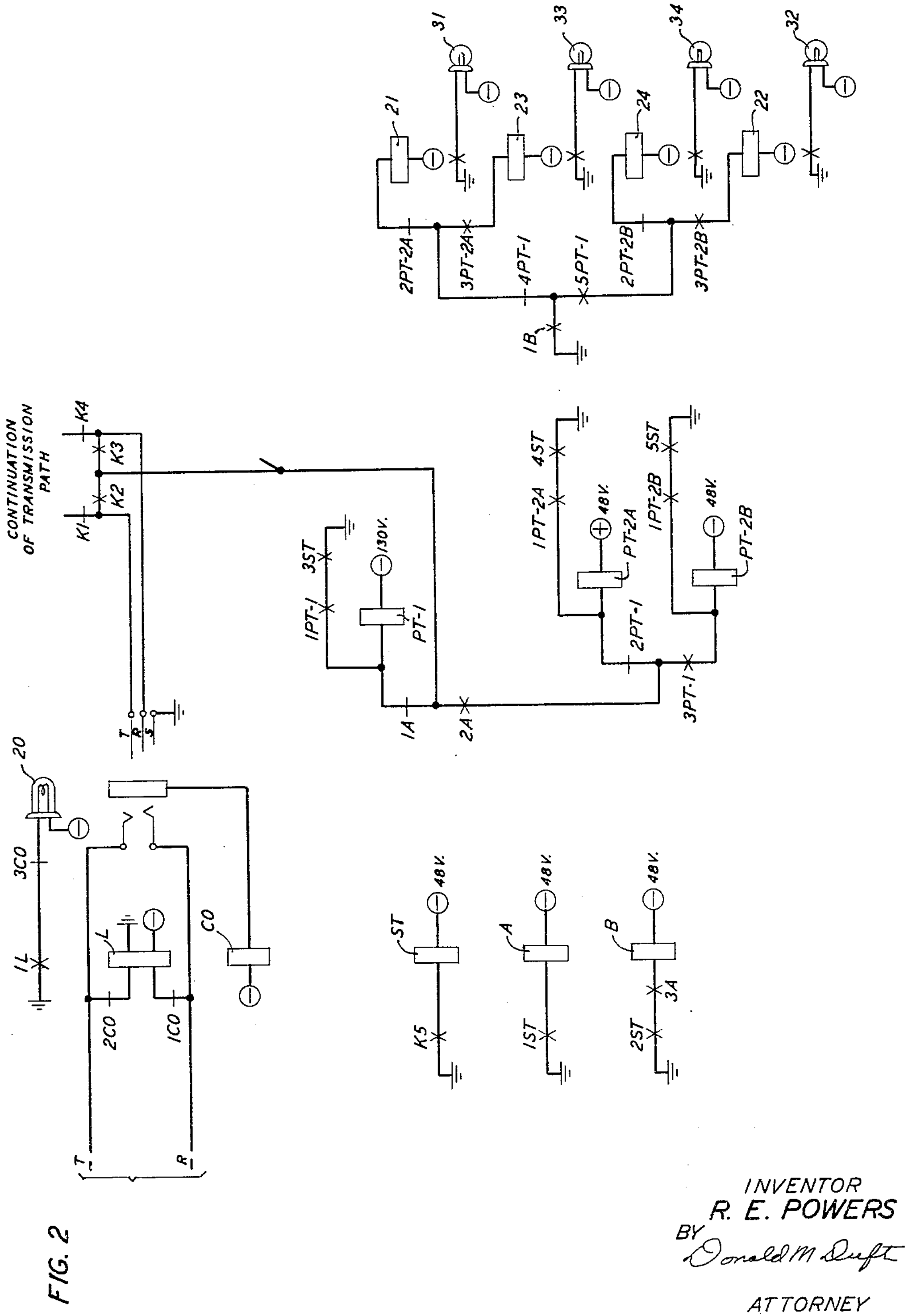

The foregoing and other objects and features of the invention, the novel features of which are specifically set forth in the claims appended hereto, may be more readily understood from the following description when read with reference to the attached drawings in which FIG. 1 shows the circuits of the four subsets connected to the line, and FIG. 2 shows the central office circuits associated with the present invention.

The four subsets shown in FIG. 1 are connected to the tip and ring conductors, designated T and R in the lower left-hand corner of FIG. 1. These wires lead to the similarly designated conductors shown in the upper left-hand corner of FIG. 2.

Referring to the second subset on the line, designated Station Two, it may be seen that it contains a pair of switchhook contacts SW2A and SW2B, shown in their normal on-hook position, which operate when the telephone is removed from the subset. This subset also contains condensers C3 and C4, resistors R3 and R4, inductances L3 and L4, a set of dial pulse contacts designated DP2, a pair of oppositely poled rectifiers V2, a microphone M2, and a ringer. The rest of the circuit elements comprising this subset are represented diagrammatically by the box entitled "Rest of Subset" since the details thereof are of no importance to an understanding of the present invention. The subsets for the other three stations on the line are similar to that of Station Two, except for certain differences which are described hereinafter.

Referring again to Station Two, it may be seen that both the tip and ring of the line have a fairly low direct-current impedance path to ground whenever the subset of this station is in an off-hook condition. At this time the ring lead is connected through closed switchhook contacts SW2B, inductance L4, resistor R4, and through one winding of the ringer to ground. The tip lead is connected through closed switchhook contacts SW2A, dial pulse contacts DP2, inductance L3, microphone M2, and through the same ringer winding to ground.

Referring now to Station Three, it may be seen that when its subset is in an off-hook condition, the tip and ring conductors are connected over similar paths to ground through a network comprising a rectifier V7 and resistor R7 in series. Whenever the subset of Station Four is in a calling condition, the tip and ring conductors are connected to ground through a network comprising oppositely poled rectifiers V5 and V6 and resistor R10 in series. Referring to Station One, it may be seen that its subset contains no direct-current path whereby the tip and ring are connected to ground whenever it is in a calling condition. In summary, Station Two provides a low impedance direct-current path to ground when in a calling condition; Station Three provides a low impedance direct-current path to ground for positive potentials only; Station Four provides a low impedance direct-current path to ground for relatively high negative potentials only because of the oppositely poled rectifiers V5 and V6; while Station One provides no direct-current path to ground.

Let it be assumed that a subscriber attempts to place a call from Station Two. When the phone is lifted from the subset, the switchhook contacts close and a path to operate relay L of FIG. 2 may be traced from ground on one winding of relay L, through the winding of relay L, break contacts 2CO of relay CO normal (unoperated), the tip of the line, closed switchhook contacts SW2A, contacts DP2, inductance L3, microphone M2, resistor R4, inductance L4, closed switchhook contacts SW2B, the ring of the line, break contacts 1CO of relay CO normal, through the winding of relay L to the negative battery. The operation of relay L closes a ground through its make contacts 1L and through break contacts 3CO of relay CO normal to energize lamp 20.

An operator, upon seeing that the lamp 20 is energized, inserts the plug into the jack of this particular line which extends a ground from the sleeve of the plug through the sleeve of the jack to the winding of relay CO, thereby operating it. The operation of relay CO opens its break contacts 3CO, which extinguishes lamp 20. The operation of relay CO also opens its break contacts 1CO and 2CO, thereby disconnecting relay L from the line.

Next, the operator operates a key, not shown, having contacts K1, K2, K3, K4 and K5 in order to ascertain which one of the four parties on the line is initiating this call. The operation of the key closes its make contacts K5, which complete an obvious path to operate relay ST. The operation of the key also opens its break contacts K1 and K4 and closes its make contacts K2 and K3, thereby disconnecting the tip and ring of the operator's plug from the transmission path and connecting the now simplexed line through break contacts 1A of relay A to the winding of relay PT–1. The negative 130 volt potential now applied to the line through the winding of relay PT–1 comprises the first test for ascertaining the identity of the calling party.

A path is now closed to operate relay PT–1 from the negative 130 volt battery on one side of its winding, through its winding, break contacts 1A of relay A, make contacts K2 and K3 of the key, to the tip and ring of the line. One path continues through operated switchhook contacts SW2B through inductance L4, resistor R4, and one winding of the ringer to ground. The other path may be traced from the tip lead, through closed switchhook contacts SW2A, dial pulse contacts DP2, inductance L3, microphone M2, through the same ringer winding to ground.

At this point, it should be noted that relay PT–1 would not operate if the call is initiated by Station One since its subset contains no direct-current path to ground. Also, relay PT–1 would not operate if the call is initiated by Station Three, since sufficient back current cannot flow through rectifier V7 to permit relay PT–1 to operate. If Station Four is initiating the call, relay PT–1 would operate because the negative 130 volt test potential is sufficient to overcome the back resistance of oppositely poled rectifier V6, thereby permitting sufficient current to operate relay PT–1 to flow through rectifier V5 and resistor R10 to ground.

In summary, it may be seen that the interconnection of relay PT–1 to the simplexed line comprises the first test to determine which of the four parties is initiating the call. Accordingly, relay PT–1 operates at this time if either the second or the fourth station is initiating the call and does not operate if either Station One or Station Three is calling.

The operation of relay ST, concomitant with the closure of contacts K5 of the operator's key, closes its make contacts 1ST to close an obvious path for relay A. This relay is sufficiently slow in operating so that it does not operate until relay PT–1 has had ample time either to operate or not to operate, depending upon what party is initiating the call.

Continuing with the assumption that the call is being initiated by a subscriber at Station Two, relay PT–1 operates as before described and locks to ground through its make contacts 1PT–1 and make contacts 3ST of relay ST operated.

Relay A, being of the slow operate type, operates only after relay PT–1 has had ample time to operate; relay A operated disconnects the simplexed line from the winding of relay PT–1 by opening its break contacts 1A and connects the line through its make contacts 2A, through make contacts 3PT–1 of relay PT–1 operated, to the winding of relay PT–2B.

A negative 48 volt battery is now applied to the simplexed line from the winding of relay PT–2B as a second test in order to determine which party is initiating the call. The operation of relay PT–1 narrowed the choice from four parties to two and indicated that either the second or fourth party is initiating the call. Since it has been assumed that the call is coming from Station Two, the negative 48 volt test potential encounters the previously described low impedance direct-current path to ground, thereby causing sufficient current to flow to operate relay PT–2B. The operation of this relay closes a locking path for itself through its make contacts 1PT–2B and make contacts 5ST of relay ST operated to ground.

The operation of relay A also closes a ground through make contacts 2ST of relay ST operated, through make contacts 3A of relay A operated, to the winding of relay B. Relay B, however, is of the slow operate type and does not operate until relay PT–2B has ample time to operate. When relay B operates, it closes a path from ground through its make contacts 1B, make contacts 5PT–1 of relay PT–1 operated, make contacts 3PT–2B of relay PT–2B operated, to relay 22, thereby operating it. The operation of this relay closes a ground over an obvious path to energize lamp 32, thereby indicating to the operator that the call is coming from the second party on the line.

If the fourth party on the line had initiated the call instead of the second party, relay PT–1 would have operated during the first test. However, during the second test, when the negative 48 volt potential is applied to the line, relay PT–2B would not have operated because the negative 48 volts would have been insufficient to break down the back resistance of rectifier V6 and, therefore, insufficient current would flow to operate relay PT–2B. In this case, the operation of relay B would close a ground through its make contacts 1B, make contacts 5PT–1, break contacts 2PT–2B, to operate the relay 24 and, in turn, energize lamp 34 for party 4.

If the parties associated with Stations One or Three had initiated the call, relay PT–1 would not have operated when the first test potential was applied since the subset of Station One contains no direct-current path to ground while the subset of Station Three contains a direct-current path to ground which includes rectifying device V7 poled in such a manner as to prevent sufficient current from flowing to allow PT–1 to operate. In this event, a positive 48 volts would be applied to the line as a second test upon the operation of relay A. If the call were initiated by Station One, the positive 48 volt test potential would find no direct-current path to ground and hence, relay PT–2A would not operate. The operation of relay B then would close the ground from make contacts 1B through contacts 4PT–1 of relay PT–1 normal, through contacts 2PT–2A of relay PT–2A normal, to operate relay 21 and energize lamp 31 for party 1.

If the call were initiated by Station Three, the circuit comprising rectifier V7 and resistor R7 would provide a direct-current path of sufficiently low impedance to allow enough current to flow to operate relay PT–2A. The operation of this relay closes a locking path for itself over its contacts 1PT–2A and make contacts 4ST of relay ST operated to ground. A path is then closed from ground upon the operation of relay B through its contacts 1B, break contacts 4PT–1, make contacts 3PT–2A of relay PT–2A operated, to operate relay 23 and energize lamp 33 for party 3.

When the operator observes which of the four parties on the line is initiating the call, as indicated by the energized lamp, she will then effect whatever further steps are necessary to insure that the proper party is charged for the call. For example, she could manually write the information on a piece of paper or, she could operate a peg count register for the proper party.

Once she has recorded this information, she releases the key thereby opening make contacts K2 and K3 and closing break contacts K1 and K4, and thereby disconnecting the tip and ring of the calling line from the test circuit and interconnecting it with the transmission path leading to the next switching stage. The release of the key also opens make contacts K5 which releases relay ST, which, in turn, releases relays A and B. The release of relay ST also releases any of the operated test relays PT–1, PT–2A or PT–2B. The release of these relays together with the release of relay B releases the relay and extinguishes the lamp associated with the calling party.

Many of the two-party lines now in use have their subsets wired in the same manner as Stations One and Two of the present invention, i.e., one subset has no (an infinitely high) direct-current path to ground while the other subset has a low impedance direct-current path to ground. The calling parties on these lines are currently identified by a test circuit comprising a single party-test relay which either operates or remains normal, depending upon whether it finds the presence or the absence of a ground on the line upon the initiation of a call.

The test circuit of the present invention could advantageously be utilized to ascertain the identity of a calling party in offices containing two-party lines of this type and four-party lines of the type disclosed herein. Both types of lines could be associated with the present test circuit since the electrical condition of the line is, obviously, the same when Station One or Two on a two-party line is calling as they are when Station One or Two on the presently disclosed four-party line is calling.

The present invention is also advantageous in that it requires a minimum of modification and expense in adapting presently installed subsets to work with it. For example, the subsets of Stations One and Two require no extra parts. The subset of Station Three requires only an additional resistor and a diode, while Station Four requires only one additional resistor plus two diodes. These extra parts are inexpensive, may be as small as is desired, and may be easily and quickly installed on the subscriber's premises. These advantages are of paramount importance to telephone companies and they make the present invention far superior to any system which would necessitate totally new subsets or a return to the factory for extensive modification of the presently installed subsets.

It is to be understood that the above discussed arrangements are but illustrative of the application of the principles of the invention. Numerous changes and modifications may be made thereto without departing from the spirit and scope of the invention. For example, the present invention has been shown associated with a manual office for purposes of simplicity in presentation. Actually, it is ideally suited for use with most present-day switching systems. For example, in the crossbar types of switching systems, the central office test equipment could, advantageously, be incorporated into the incoming register or the sender. In this case the contacts connected to lamps 31, 32, 33 and 34 would, instead, be connected to energize some sort of recording equipment, such as the well known Automatic Message Accounting system now in use in the Bell Telephone System.

What is claimed is:

1. In a telephone system, a telephone line having more than two subsets thereon, each of said subsets having an impedance path to ground which is unique, a central office, means at said central office whereby a first test potential is applied to said line upon the initiation of a call from one of the subsets thereon, means effective after the application of said first test potential to said line and variably responsive in accordance with which one of said subsets is initiating a call for selectively applying as a second test potential to said line one of a plurality of available test potentials, means responsive to the application of said second test potential for partially manifesting the identity of any calling subset, and means including said last named means solely responsive to the application of said first and second test potentials to said line for manifesting the identity of any calling subset thereon.

2. In a telephone system, a telephone line having a plurality of subsets thereon, each of said subsets having an impedance path to ground which is unique either in magnitude or polarity or both, a central office, means at said central office whereby a first test potential is applied to said line upon the initiation of a call from one of the subsets thereon, means for ascertaining the electrical condition of said line during the application of said first test potential thereto, means responsive to said ascertainment and variably responsive in accordance with which of said subsets is initiating a call for selectively applying to said line as a second test potential one of a plurality of available test potentials, means for ascertaining the electrical condition of said line during the application of said second test potential thereto, and means solely responsive to said first and second ascertainments for manifesting the identity of any calling subset on said line.

3. In a telephone system, a telephone line, a first, a second, a third and a fourth subset connected to said line, some of said subsets having a higher direct-current impedance path to ground than do the others and some of said subsets having a direct-current polarizing element in their impedance paths to ground, means connectable to said line upon the initiation of a call by one of said subsets whereby a relatively high negative potential is first applied to said line, a first responsive means operable upon the application of said relatively high negative potential to said line when either said second or fourth subset initiates a call and non-operable when said first or third subset initiates a call, means operable upon the operation of said first responsive means for applying a relatively low negative potential to said line, a second responsive means operable upon the application of said relatively low negative potential to said line when said second subset initiates a call and non-operable when said fourth subset initiates a call, means operable as a result of the non-operation of said first responsive means whereby a relatively low positive potential is applied to said line, a third responsive means operable upon the application of said relatively low positive potential to said line when said third subset initiates a call and non-operable when said first subset initiates a call, and an output circuit conditioned by the operation and non-operation of said first, second and third responsive means to manifest which of the plurality of subsets on said line is initiating a call.

4. In a telephone system, a telephone line, a first, a second, a third and a fourth subset connected to said line, each of said subsets having an impedance path to ground that is unique either in magnitude or polarity or both, means connectable to said line upon the initiation of a call from one of said subsets whereby a first test potential is applied to said line, a first responsive means operable upon the application of said first test potential to said line when either said second or fourth subset initiates a call and non-operable when said first or third subset initiates a call, means responsive to the operation of said first responsive means for applying a second test potential having a fixed characteristic to said line, a second responsive means operable upon the application of said second test potential to said line when said second subset initiates a call and non-operable when said fourth subset initiates a call, means effective upon the non-operation of said first responsive means whereby a second test potential having different fixed characteristics from said first mentioned second test potential is applied to said line, a third responsive means operable upon the application of said last-named second test potential to said line when said third subset initiates a call and non-operable when said first subset initiates a call, and an output circuit conditioned by the operation and non-operation of said first, second and third responsive means to manifest which of the plurality of subsets is initiating a call.

5. In a telephone system a telephone line, a first, a second, a third and a fourth subset connected to said line said first subset having an extremely high impedance path to ground, said second subset having a relatively low direct-current impedance path to ground, said third subset having a relatively low impedance path to ground in series with a positively poled rectifying device, said fourth subset having a relatively low impedance path to ground in a series with a pair of oppositely poled rectifying devices, means connectable to said line upon the initiation of a call by one of said subsets whereby a relatively high negative potential is first applied to said line, a first responsive relay operable upon the application of said relatively high negative potential to said line when either said second or fourth subset initiates a call and non-operable when said first or third subset initiates a call, means responsive to the operation of said first responsive relay for applying a relatively low negative potential to said line, a second responsive relay operable upon the application of said relatively low negative potential to said line when said second subset initiates a call and non-operable when said fourth subset initiates a call, means effective upon the non-operation of said first responsive relay whereby a relatively low positive potential is applied to said line, a third responsive relay operable upon the application of said relatively low positive potential to said line when said third subset initiates a call and non-operable when said first subset initiates a call, and an output circuit conditioned by the operation and non-operation of said first, second, and third responsive relays to manifest which subset is initiating a call.

References Cited in the file of this patent

UNITED STATES PATENTS

| | | |
|---|---|---|
| 1,831,385 | Hague | Nov. 10, 1931 |
| 2,281,508 | Lundstrom | Apr. 28, 1942 |
| 2,794,859 | Abbott et al. | June 4, 1957 |
| 2,820,100 | Abbott | Jan. 14, 1958 |
| 2,901,544 | Collins | Aug. 25, 1959 |